United States Patent
Goodrich et al.

[15] 3,696,688

[45] Oct. 10, 1972

[54] AUTOMATIC BALANCER FOR ROTATING MASSES

[72] Inventors: Eugene A. Goodrich, 4101 Wedgworth Road South; Robert H. Johnson, 6601 South Hulen Street, both of Fort Worth, Tex. 76133

[22] Filed: May 3, 1971

[21] Appl. No.: 139,758

[52] U.S. Cl. ..................................74/573, 188/1 B
[51] Int. Cl. .............................................F16f 15/32
[58] Field of Search ..............74/573, 574; 301/5 BA; 188/1 B; 51/169; 64/1 V

[56] References Cited

UNITED STATES PATENTS 3,109,321  11/1963  Rogers..........................74/573
3,346,303  10/1967  Wesley....................74/573 X Primary Examiner—William F. O'Dea
Assistant Examiner—F. D. Shoemaker
Attorney—Wofford, Felsman & Fails

[57] ABSTRACT

An automatic balancer for rotating masses comprised of a race having a semicircular periphery and parallel inner walls, a hub snugly received in the race and of a width to engage the walls' inner circumferences and steel balls in the race, the balls having radii slightly less that the radius of the semicircular portion of the race periphery.

3 Claims, 3 Drawing Figures

PATENTED OCT 10 1972　　3,696,688

EUGENE A. GOODRICH
ROBERT H. JOHNSON
　　　INVENTORS

BY *Herbert J. Brown*
　　　ATTORNEY

AUTOMATIC BALANCER FOR ROTATING MASSES

This invention relates to automatic balancers for damping vibrations in rotating masses such as rotors in jet engines, grinders, helicopter rotors, propellers, shafts, etc., and which balancer is of the type having ball weights in a race rotating about an axis.

Heretofore balancers of the type referred to were not effective at extremely high speeds because they were not precision made. At high speeds, due to slight imperfections in the races, the balls tended to bunch and created worse vibrations than those corrected at lower speeds. It is to be understood that the present invention is not directed to precision fabrication per se, but has to do with a construction readily capable of precision fabrication.

The primary object of the invention is to provide an automatic balancer of the race and ball type capable of balancing masses at high rotational velocities, for example, in excess of 1500 r.p.m. as well as low velocities.

Another object of the invention is to provide a balancer of the described class which readily lends itself to precision fabrication.

Another object of the invention is to provide a ball and race balancer capable of employing large ball weights at high speeds.

A further object is to provide a ball and race balancer having perfectly balanced means for injecting a lubricating and damping fluid in the race.

Figure 1:
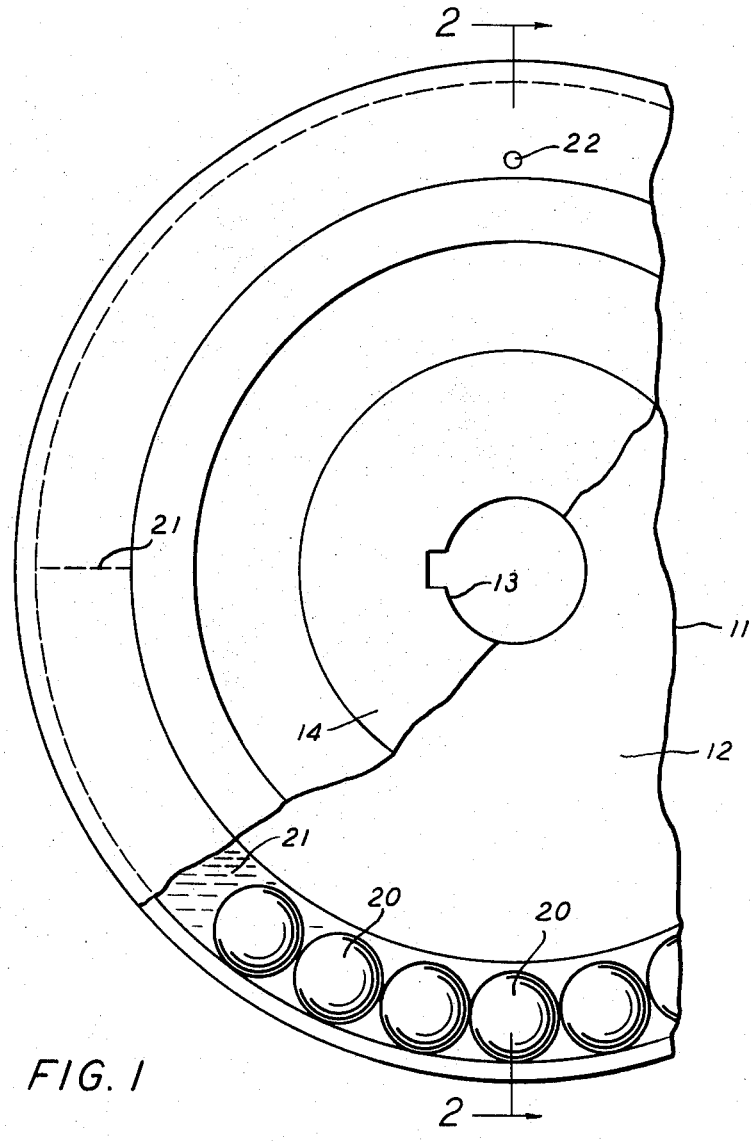
Figure 2:
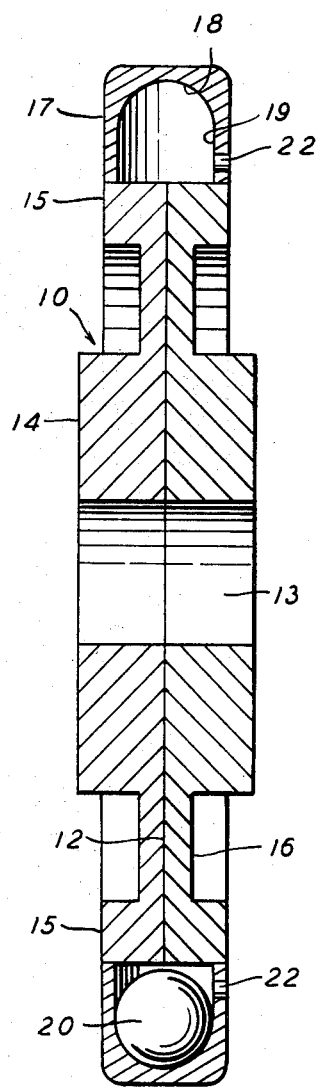
Figure 3:
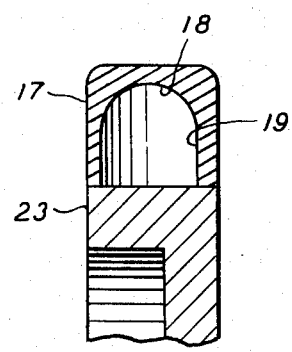

These and other objects of the invention will become apparent from the following description and the accompanying drawing, in which:

FIG. 1 is a broken elevational view of a device according to the invention for balancing rotating masses, FIG. 2 is a vertical sectional view taken on line 2—2 of FIG. 1, and FIG. 3 is a sectional view similar to the upper portion of FIG. 2 but showing a modified form of the invention.

In the form of the invention shown in FIGS. 1 and 2 a wheel portion 10 is comprised of identical halves 11 having contacting flat center surfaces 12 and a shaft receiving opening 13 therethrough. Each wheel half 11 has a hub 14, a circumferential flange 15 and a web 16 between the hub and the flange.

An important feature of the invention is the construction of the race element 17 which is of metal, and because of its shape the inner surface may be precision finished and polished. The race element 17 is in the form of a ring having flat sides and a cylindrical outer periphery. The internal groove of the race element 17 has a semicircular outer cross-section 18 and tangential parallel side walls 19. The described groove of the race element 17 is of a size to receive a row of round weights or balls 20 of stainless steel or similar hardness, and each ball is as nearly perfect in shape and is as uniform in density as possible. Preferably, the ball weights 20 are relatively large as shown in the drawing. The relatively thick outer peripheral corners of the race element 17 provide added strength, particularly at high speeds. The balls 20, when adjacent each other, extend about one-fourth to about two-thirds of the groove's circumference.

About one-half of the groove of the race element 17 is filled with liquid silicone 21 or other lubricant which has a damping effect on the movement of the balls 20. The fluid 21 is introduced through one of two diametrically opposite holes, not numbered, in a wall 19 of the race element 17, which holes are subsequently plugged as at 22. It is to be noted that the plugs 22 are inwardly of the centers of balls 20 when the latter are received in the race.

The form of the invention shown in FIG. 3 is like the foregoing except that there is a single flange 23 spanning the inner circumferences of the race walls 19 instead of the two flanges 15 as shown in FIG. 2. The flanges 15 or 23 may be pressed in the race element 17 or they may be chamfered, welded and ground, not shown.

Although the forms of the invention shown in the drawing are in vertical positions, it is to be understood that they will operate horizontally or at any angle. In operation the balancer is concentrically mounted on and turns about the axial center of the rotating mass to be balanced, and the balls 20 position themselves upon rotation of the mass to oppose the eccentric mass portion which tends to cause imbalance.

The invention is not limited to the exemplary constructions herein shown and described but may be made in various ways within the scope of the appended claims.

What is claimed is:

1. A device for automatically balancing a rotating mass and consisting of a cylindrical race element, an annular internal groove therein, the inner surface of said groove having an outer semicircular portion in cross section and side walls parallel with each other and tangential with the semicircular portion, a wheel portion having cylindrical outer surface engaging the inner circumferences of said side walls, ball weights received within said groove, the diameters of said ball weights being of a size to substantially span the distance between said side walls and means lubricating said balls.

2. A device for automatically balancing a rotating mass as defined in claim 1 and wherein the distances between the outer peripheral corners of said race element and the semicircular portion of said groove are greater than the thicknesses of said side walls.

3. A device for automatically balancing a rotating mass as defined in claim 1 and wherein said means lubricating said ball weights is a fluid, and diametrically opposite plugged openings in a said side wall for receiving and then sealing said fluid in the groove of said race element.

* * * * *